(12) United States Patent
Armbrust et al.

(10) Patent No.: US 12,553,537 B2
(45) Date of Patent: Feb. 17, 2026

(54) CONTROL DEVICE FOR FILTER INSTALLATIONS

(71) Applicant: FRESENIUS MEDICAL CARE DEUTSCHLAND GMBH, Bad Homburg (DE)

(72) Inventors: Sebastian-Johannes Armbrust, Obertshausen (DE); Wolfgang Wehmeyer, Tuebingen (DE); Gerhard Wiesen, Bad Homburg (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 3 days.

(21) Appl. No.: 18/684,849

(22) PCT Filed: Aug. 23, 2022

(86) PCT No.: PCT/EP2022/073420
§ 371 (c)(1),
(2) Date: Feb. 20, 2024

(87) PCT Pub. No.: WO2023/025771
PCT Pub. Date: Mar. 2, 2023

(65) Prior Publication Data
US 2024/0353022 A1 Oct. 24, 2024

(30) Foreign Application Priority Data
Aug. 23, 2021 (DE) .................. 10 2021 121 809.8

(51) Int. Cl.
*F16K 31/126* (2006.01)
*B01D 35/157* (2006.01)
(Continued)

(52) U.S. Cl.
CPC ...... *F16K 31/1266* (2013.01); *B01D 35/1573* (2013.01); *B01D 46/4272* (2013.01); *F16K 7/07* (2013.01); *F16K 7/075* (2013.01)

(58) Field of Classification Search
CPC ........ F16K 31/1266; F16K 7/07; F16K 7/075; B01D 46/4272; B01D 35/1573
See application file for complete search history.

(56) References Cited

U.S. PATENT DOCUMENTS 3,717,176 A * 2/1973 Smith ................... F16K 7/07
251/5
3,838,704 A * 10/1974 Johnson ............... F16K 7/075
137/315.07
(Continued)

FOREIGN PATENT DOCUMENTS

CA 2985454 A1 5/2019
CH 239812 A 11/1945
(Continued)

OTHER PUBLICATIONS

International Search Report and Written Opinion (with English translation of International Search Report) issued in corresponding International Patent Application No. PCT/EP2022/073420 mailed Dec. 13, 2022 (15 pages).

*Primary Examiner* — Umashankar Venkatesan
(74) *Attorney, Agent, or Firm* — Kilyk & Bowersox, P.L.L.C.

(57) ABSTRACT

The invention relates to a flow control device (10) for industrial filter installations, said flow control device comprising: a valve device (20) which is located in a flow line to, in or from a filter installation, the valve device (20) having a closed-loop control section (23) which is connected to the flow line and which can be controlled in a closed-loop manner via at least one deformable membrane (30); a hydraulic device (40) which controls the pressure in a
(Continued)

hydraulic duct (32, 46) in a closed-loop manner by means of an actuator (42), the hydraulic duct (32, 46) being connected to the valve device (20) in such a way that the membrane (30) increases or reduces the flow cross-section depending on the pressure in the hydraulic duct (32, 46); a drive (60) for driving the hydraulic device; and an open-loop control unit (80) which controls the flow control device (10) in an open-loop manner.

20 Claims, 2 Drawing Sheets

(51) Int. Cl.
*B01D 46/42* (2006.01)
*F16K 7/07* (2006.01)

(56) References Cited

U.S. PATENT DOCUMENTS

| | | | | |
|---|---|---|---|---|
| 3,942,756 | A * | 3/1976 | Brumm | F16K 7/075 251/5 |
| 4,083,375 | A * | 4/1978 | Johnson | F16K 7/075 137/86 |
| 4,253,484 | A * | 3/1981 | Danon | G05D 16/163 137/86 |
| 4,282,757 | A * | 8/1981 | Cohn | F16K 7/075 137/115.17 |
| 4,313,461 | A * | 2/1982 | Brumm | F16K 7/075 137/489 |
| 4,333,496 | A * | 6/1982 | Chow | F16K 7/075 137/489 |
| 4,451,023 | A * | 5/1984 | Zakai | F16K 7/075 251/5 |
| 4,645,174 | A * | 2/1987 | Hicks | G01F 25/10 251/5 |
| 5,036,879 | A * | 8/1991 | Ponci | F17D 1/20 137/853 |
| 5,049,042 | A * | 9/1991 | Mathieu | F04C 28/28 251/30.05 |
| 5,671,774 | A * | 9/1997 | Klein | F16K 7/075 137/488 |
| 5,882,516 | A * | 3/1999 | Gross | A61M 1/3437 210/321.89 |
| 7,665,713 | B1 * | 2/2010 | Clark | F16K 31/0627 251/5 |
| 9,480,945 | B2 * | 11/2016 | Billiet | B01D 53/047 |
| 9,718,082 | B2 * | 8/2017 | deVilliers | B05C 9/10 |
| 11,156,299 | B2 * | 10/2021 | Nelson | F16K 17/36 |
| 2008/0083889 | A1 * | 4/2008 | Raftis | F16K 7/07 251/5 |
| 2008/0105839 | A1 * | 5/2008 | Jennings | F16K 7/07 251/366 |
| 2016/0319955 | A1 | 11/2016 | Gebauer et al. | |
| 2020/0282361 | A1 | 9/2020 | Gebauer et al. | |

FOREIGN PATENT DOCUMENTS

| | | |
|---|---|---|
| DE | 19934574 A1 | 2/2001 |
| EP | 0341340 A1 | 11/1989 |
| GB | 2059115 A | 4/1981 |
| GB | 2507050 A | 4/2014 |
| WO | 2011067794 A1 | 6/2011 |

\* cited by examiner

CONTROL DEVICE FOR FILTER INSTALLATIONS

This application is a National Stage Application of PCT/EP2022/073420, filed Aug. 23, 2022, which claims priority to German Patent Application No. 10 2021 121 809.8, filed Aug. 23, 2021.

FIELD OF THE INVENTION

The invention relates to a flow control device for filter systems and a method for flow control.

PRIOR ART

Diaphragm valves, among other things, are currently also used in fluid routing systems for filter systems. They are used, for example, to control the fluid supplied to the filter system and are actuated with mechanical actuators. This is mainly due to the fact that proven actuators such as a cam device or, as in DE 199 34 574 C2, a rod-shaped actuator are used for the elastic diaphragms.

In particular, when many different lines have to be controlled, the structure of such multifunctional blocks becomes complex. This can be seen, for example, in DE 199 34 574 C2. This document discloses a fluid system with flow paths for gases and/or liquids, with prismatic functional/structural units which have flow channels and connection openings in end faces for adjacent functional/structural units, and with a mounting plate for the functional/structural units, with the functional/structural units having a base area consisting of a square with a standard edge length or composed of several such squares, and all functional/structural units are fixed with their base area on the mounting plate, with the functional/structural units containing bores in the base area thereof and the mounting plate in a corresponding grid for the attachment and lying adjacent one another with side surfaces in the attachment position and the connection openings being enclosed by annular recesses, in each of which at least one sealing ring is arranged, which rests against the wall of the recess in a sealing manner. Such multifunctional blocks are complex in design and maintenance.

PRESENTATION OF THE INVENTION

The object of the present invention is, therefore, to provide a flow control device which is simple in design but can be operated reliably. The object is achieved by means of a flow control device and a method according to the present invention.

A flow control device according to the invention, in particular for industrial filter systems, comprises a valve device which is arranged in a flow line to, in, or from a filter system, the valve device having a control section which is connected to the flow line and which can be controlled via at least one movable diaphragm; a hydraulic device which regulates the pressure in a hydraulic channel using an actuator, the hydraulic channel being connected to the valve device in such a way that the diaphragm increases or decreases the flow cross-section depending on the pressure in the hydraulic channel; a drive for driving the hydraulic device; and a control unit which controls the flow control device. By omitting the mechanical components, the combination of a valve device with a diaphragm valve and a hydraulic device results in a passage control device that is structurally simple in design, but which functions reliably and can be controlled. The valve chamber is preferably designed as a bore and in particular has a cover with which the valve chamber can be opened and closed. As a result, not only can the valve element be mounted very easily, but maintenance or replacement is also made considerably easier.

The diaphragm of the diaphragm valve can be cylindrical or tubular and the hydraulic line is preferably arranged circumferentially around the diaphragm. Such a diaphragm can accommodate a valve element in a simple manner. With a circumferentially arranged hydraulic line, the diaphragm can then be precisely actuated and the flow of the working fluid can be precisely regulated.

The control unit preferably measures the pressure in the hydraulic line or the force acting on the actuator and limits or switches off the drive if a limit value is exceeded. This prevents parts of the hydraulic or valve device, in particular even the diaphragm, from being damaged.

Furthermore, the flow control device may comprise an expansion tank, which is designed in particular as a diaphragm tank. This expansion tank has a predetermined volume of air that can be introduced into the hydraulic channel. In this way, a safe opening or closing of the diaphragm can be guaranteed with incompressible hydraulic fluids.

The drive is preferably switched off when the diaphragm valve is in the open state. Furthermore, the flow control device can comprise a plurality of valve devices which are arranged in a multifunctional block. This is possible in a space-saving manner due to the simple design, and such a multifunctional block is therefore comparatively low-maintenance.

During operation, the pressure in the hydraulic line is preferably at least 50% of the pressure in the flow line, in particular in the feed line. This ensures that the diaphragm can close reliably.

The control section is preferably designed as a valve chamber, in particular as a bore, with a valve element, the valve element having a partition and openings which direct the fluid past the partition. The valve element is in particular substantially prismatic or cylindrical. This allows the valve element to be replaced and facilitates maintenance of the valve device. Preferably a smaller diameter towards the center than at the edge. Such a valve element can be easily fixed in the valve chamber due to its geometry without additional fastening elements having to be provided. This applies in particular when the valve chamber and valve element have a similar cross-section. The openings are preferably in the form of elongated holes.

Preferably, the diaphragm of the valve device is continuously adjustable and lockable in any intermediate position. In principle, the intermediate position can therefore be any position of the diaphragm between completely open and completely closed. As a result, the volumetric flow of the working fluid can be set very precisely. A method according to the invention for operating a flow control device, particularly for industrial filter systems, comprises the steps of driving a hydraulic device with an actuator for introducing hydraulic fluid into or removing hydraulic fluid from a hydraulic line and opening and closing a diaphragm valve by means of the hydraulic fluid in the hydraulic line. The hydraulic device simplifies the structure of the flow control device and still enables precise control of the volumetric flow of the working fluid.

The force of the actuator or the pressure of the hydraulic device is preferably measured, and the drive is limited or switched off when a limit value is reached.

In particular, the diaphragm valve can be continuously adjusted and retained in any desired intermediate position. This enables a more precise adjustment of the volumetric flow of the working fluid.

In a preferred embodiment, the flow control device comprises a pressure transmission device to support the drive when driving the hydraulic device. This can be designed passively with a diaphragm chamber, in particular by transferring the working pressure in a channel to be controlled, e.g. feed channel, to the drive side of the hydraulic device. However, it can also be actively designed with sensors and a pressure generating device, e.g. another hydraulic cylinder. The pressure transmission device makes it easier to control the flow control device at high pressures and reduces wear on the drive device.

DESCRIPTION OF THE PREFERRED EMBODIMENTS

Figure 1:
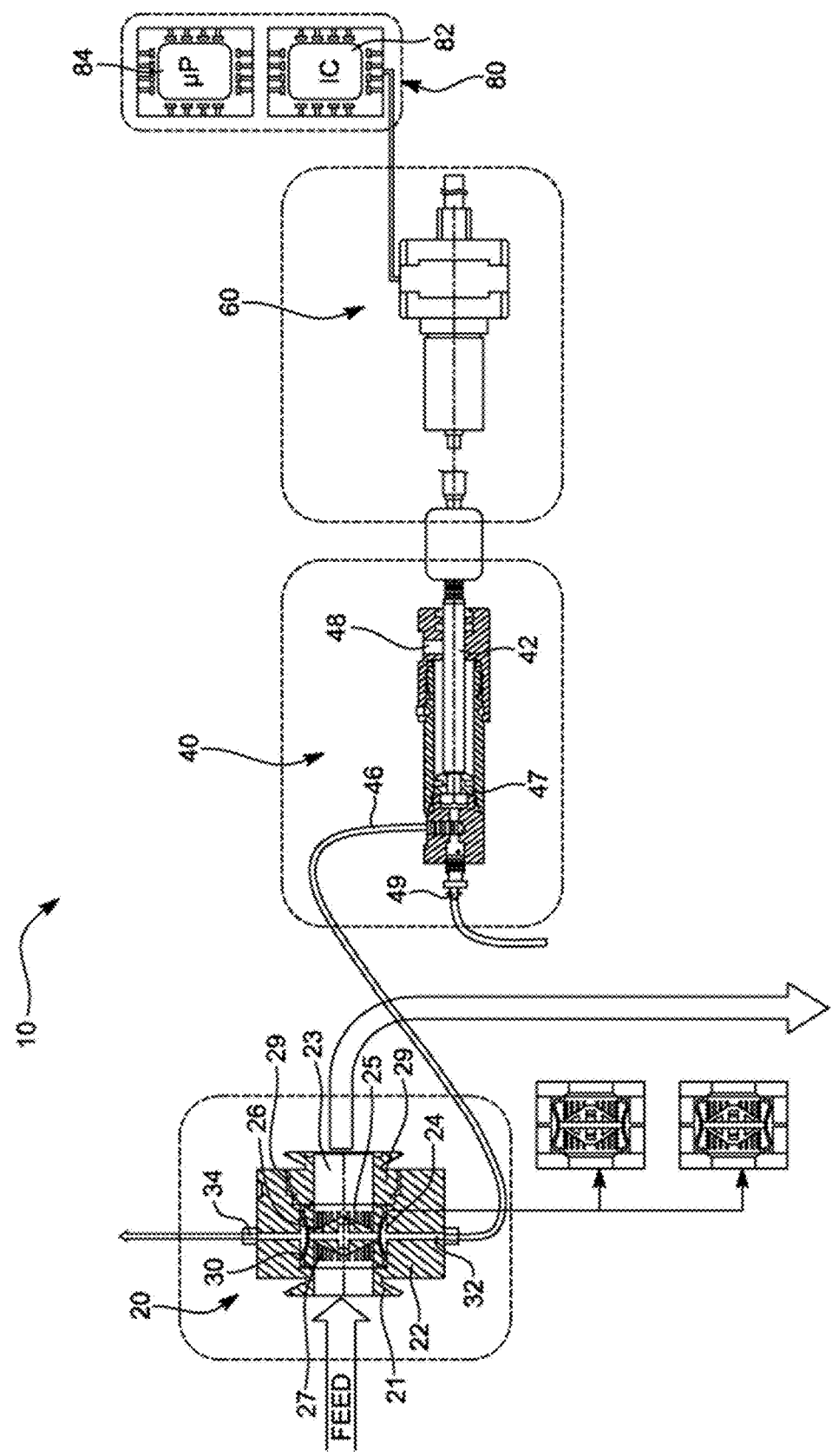
FIG. 1 shows a schematic structure of a flow control device according to the invention.

FIG. 1 shows an embodiment of a flow control device 10 according to the invention, particularly for industrial filter systems, for filtering working fluids. The flow control device 10 comprises a valve device 20, a hydraulic device 40, a drive 60 for the hydraulic device 40, and a control device 80 which controls the drive and preferably also the interaction of the components.

The valve device 20 shown in FIG. 1 is designed as a diaphragm valve device, i.e. the valve device is closed and opened via a diaphragm 30. The valve device 20 is arranged in a flow device, such as a supply line for working fluid to be filtered (the so-called "feed"), a discharge line for draining filtered working fluid, or other lines in which working fluid flows. For this purpose, the flow device 10 has connections 21 which can be connected to the flow lines. Such connections can be designed as click locks or bayonet locks; they can have a thread or be screwed or riveted to a flange; however, they can also be connected irreversibly (i.e. not non-destructively separable) to the flow lines by welding or gluing. The working fluid channel through the valve device 20 including the valve section itself is referred to as the control section 23 in the following.

The valve device 20 has a housing 22 with the control section 23, which, in the embodiment shown in FIG. 1, is designed as a valve chamber 24 in which a valve element 26 is arranged. The valve chamber 24 is connected to the connections for the flow line and also has the diaphragm 30 which, together with the valve element 26, controls the regulation of the flow of the working fluid. The housing also has a hydraulic line 32 that leads to the diaphragm 30. One side of the diaphragm faces into the valve chamber 24 onto the valve element 26 while the other side faces the hydraulic line. The diaphragm 30 is elastic but liquid-tight, so that hydraulic liquid and working fluid are safely separated. The diaphragm 30 can be attached to the inside of the valve chamber 24 (e.g. with screws, by gluing, or in another way) but can also be attached to the valve element (which facilitates the replacement of the diaphragm, since only the valve element 26 has to be replaced), or it may be wedged between the wall of the valve chamber 24 and the valve element 26.

In the embodiment in FIG. 1, the valve element 26 is preferably cylindrical, in particular tubular, and has a partition 25 in the middle, which blocks the flow of working fluid. In the tubular wall, radial openings 27 are formed on both sides of the partition 25 in the circumferential direction. The openings are designed here as a plurality of elongated holes that extend over most of the corresponding tubular wall (>80% of the length of the valve element from the edge to the partition), but they can also be designed as a plurality of smaller holes. There is preferably a distance between the valve element 26 and the wall of the valve chamber 24, through which distance the working fluid is routed past the valve element 26 when the valve device 20 is open. The valve chamber ideally has a cross-section similar to the valve element in order to determine the distance between the valve chamber and the valve element more easily. However, the outer diameter of the valve element 26 preferably decreases towards the center of the valve element 26, so that the flow cross-section between the ends increases. Furthermore, the ends of the valve element 26 can then have a diameter which has contact with the valve chamber 24 and thus fixes the valve element 26 in the valve chamber 24. In general, however, the valve chamber and valve element can also be designed and attached differently. For example, the cross-section can be designed as a triangle, square, pentagon, hexagon, or even polygon, and the valve chamber and the valve element can have different cross-sections. The attachment can be realized, for example, via bores and corresponding projections/pins on the end faces of the valve element and the walls of the valve chamber 24.

The housing material of the valve device is preferably made of PP, but it can be any material that is sufficiently strong (e.g. plastic or metal) and has the desired properties when in contact with the medium flowing through (compliant with drinking water). The diaphragm is preferably made of rubber.

In order to easily mount the valve element 26 in the valve chamber 24, the valve chamber 24 can be provided on one side with a kind of cover 28 which is removably attached to the housing. In FIG. 1, this cover is screwed into the housing on one side with an external thread 29 and also comprises a connection 21. However, the cover 28 can also be formed on a side other than the connection 21.

The diaphragm 30 itself is in the form of a tubular diaphragm, in particular in the case of a cylindrical or tubular valve element, and is arranged around the valve element 26 so that it can be pressed onto the partition or onto the openings and thus interrupts the volumetric flow of the working fluid. In the preferred embodiment here, in which the hydraulic line 32 is arranged circumferentially around the diaphragm, even the flow cross-section can be controlled in a simple manner. However, the diaphragm 30 can also be designed as a flat diaphragm, so that the working fluid then only flows past the upper and lower side of the valve element and is regulated there by the diaphragm 30.

The intermediate states between a closed diaphragm 30 (this seals the openings 27) and a completely open diaphragm 30 (this one rests against the cylinder bore in the valve chamber 24) are created by injecting or draining hydraulic fluid, which results in annular gaps of different widths between the bore and the inner body. In the embodiment shown, the opening characteristic follows a quadratic function, proportional to $\pi(r_a^2 - r_i^2)$, where $r_i$ corresponds to the radius of the inner body and the diaphragm wall thickness and $r_a$ can be varied between $r_i$ (closed) and $r_{Chamber}$, i.e. the radius of the valve chamber bore minus the diaphragm wall thickness. The opening characteristic is therefore, in particular, continuous with a square progression, since an annular gap with a fixed inner radius and increasing outer radius is released or closed. The diaphragm 30 can then also be held in any desired intermediate position by suitably adjusting the pressure in the hydraulic fluid by means of the hydraulic device.

The hydraulic fluid in the hydraulic channel 32 of the valve device 20 is regulated via a hydraulic device 40, which is designed here as a hydraulic cylinder. The hydraulic device 40 has an actuator 42 by means of which the hydraulic fluid is pressed, via a hydraulic channel 46, into the hydraulic channel 32 of the valve device 20. In the embodiment shown, the actuator 42 is designed as a piston which is sealed at its end 47 with an O-ring. More specifically, volume displacement is achieved with piston movement in a double-acting hydraulic cylinder. In order to achieve simple and safe venting of the hydraulic connection to the valve, the hydraulic fluid can be filled via a special vent hole/vent screw 49. The connection to the valve device 20, including the interior volume of the valve device 20 in the closed state, is filled with hydraulic fluid until the hydraulic fluid emerges from an overhead vent hole 34 on the valve device 20. This can be closed, for example, by a screw. Thereafter, the actuator in the hydraulic device is retracted to a specific reference position and also filled with hydraulic fluid. The reference position is selected in such a way that, when the valve is opened by further retracting of the piston, there is sufficient space for the additional hydraulic fluid, but when the valve is closed by advancing the actuator 42, there is sufficient hydraulic fluid upstream of the actuator 42 to completely generate the necessary increase in force when the valve device is completely closed. Once the reference position is reached, the supply/vent screw 49 in the hydraulic device 40 must be closed. The air volume behind the piston is kept at atmospheric pressure and protected against contamination by a venting screw 48 with a filter function. In the present case, only one actuator 40 is provided, but it is of course also possible to provide several actuators and several hydraulic lines which are independent of one another.

In the present example, the pressure on the hydraulic fluid side is slightly more than 50% of the maximum working fluid pressure. When operation is within the specified pressure limits, the degree of opening of the valve remains constant regardless of the media pressure. In the case of incompressible media (hydraulically rigid system), the diaphragm valve also requires a minimum compliance volume in order to guarantee safe opening or closing. A suitable volume of air can be provided on the inlet side and/or on the outlet side, separated in an expansion tank.

In the present embodiment, the actuator 40 is moved back and forth with a spindle by a drive 60 (e.g. a stepper motor). This type of drive saves space but can also be replaced or supplemented by a toothed wheel drive or by an electromagnetically driven actuating device. Using a connecting piece, the actuator 46 of the hydraulic device 40 is firmly connected to the spindle of the stepper motor 60. By moving the spindle in and out, the piston then pushes hydraulic fluid into the hydraulic channel 32 of the valve device 20 and presses the diaphragm 30 against the partition 25 (valve closes) or removes it from the valve device (valve opens). In the fully closed position, the force on the spindle increases significantly as the closure continues. The phase shift caused by the inductive load on the motor coil is detected and evaluated via a controller 80. The controller 80 has a motor controller 82 for the drive 60 and a microprocessor 84. The zero position of the piston can be determined as the starting position for opening the valve device by reading out the respective register entry to identify the actual mechanical load. In the open state, the motor can be switched to a voltage-free state via the microprocessor to save energy. Furthermore, in other operating states, the voltage at the motor can be reduced or completely switched off depending on the pressure of the medium flowing through and the spindle thread lock, in which an unintentionally forced movement of the motor can be detected by the electronics unit and corrected by position correction at higher voltage. Another option for currentless fixing in a variable position can be realized with a spindle brake (magnetic brake braked without current).

If there is a very high pressure in the feed line, the pressure in the hydraulic line 32 must be increased accordingly in order to enable control of the valve device 20. This in turn requires an increased working pressure on the valve side 44 and on the drive side 43 in the hydraulic cylinder and thus leads to increased forces that stress the drive 60 and its components. These higher forces must then be absorbed by the spindle and the design of the motor.

Figure 2:
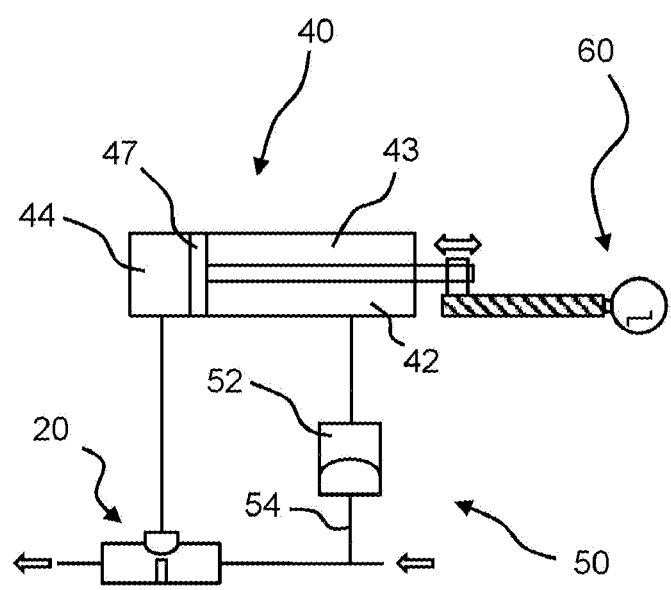
FIG. 2 shows schematically a detail of a pressure equalization device for reducing the force required to switch the valve.

Preferably, the flow control device 10 therefore comprises a pressure transmission device 52, as shown in FIG. 2, which detects the working pressure in the feed line and then transmits it accordingly to the drive side 43 of the hydraulic cylinder. Such a pressure transmission device 52 can be passive or active. The aim of the pressure transmission device 52 is to have approximately the same pressure ratios on both sides of the cylinder so that the drive, which is designed as a spindle drive, for example, can move the volumes in the hydraulic cylinder 40 with considerably reduced force. The feedback mechanism achieves this goal at any system pressure.

A passive design of the pressure transmission device 52 can, for example, have a transmission chamber 52, which is equipped in particular with a diaphragm. The pressure is tapped at the feed line (or any other line to be regulated) via a hydraulic line 54 and fed into the transmission chamber 52. There, the pressure is then transferred via a diaphragm to the drive side of the hydraulic cylinder 40.

In an active design, sensors (not shown) detect the pressure in the feed line (or any other line to be regulated). The detected pressure can then be applied to the drive side 43 of the hydraulic cylinder 40 by the pressure control of a pneumatic system in particular. For example, a pneumatic controller can apply compressed air to the drive side 43 of the cylinder. A major advantage of active control is that the slightly smaller surface area of the piston can be compensated for by slightly increasing the pressure on the drive side so that the retroactive force on the drive 60, in particular a spindle drive, becomes negligible.

Preferably, a continuation of the active design, in particular the pneumatic design, for a drive 60 with a spindle provides that an overpressure is built up to close the valve device 20, so that the piston pulls the spindle nut of the drive 60 in the direction of movement. When the valve is opened, the drive side 53 is then depressurized so that the hydraulic pressure in the feed line 32 wants to drive the spindle in the direction of movement via the hydraulic cylinder. Self-locking, e.g. due to the thread pitch of the spindle, ensures that the spindle is only actually moved by the motor.

The valve device 20 can also be installed in a complex multifunctional block and only has to be connected to the hydraulic line there. The rest of the actuators and electronics can be mounted at any distance and in any position. Thus, the approach of the multifunctional block is not influenced by space-consuming mechanical components (e.g. motor for adjusting a ball valve).

LIST OF REFERENCE NUMERALS

Flow control device 10
Valve device 20
Housing 22
Control section 23
Valve chamber 24
Partition 25
Valve element 26
Openings 27
Cover 28
Thread 29
Diaphragm 30
Hydraulic line (of the valve device) 32
Vent hole 34
Hydraulic device 40
Actuator 42
Drive side 43
Valve side 44
Hydraulic channel (of the hydraulic device) 46
End of actuator 47
Vent hole/vent screw 49
Compensating device 50
Pressure transmission device 52
Hydraulic line 54
Drive 60
Controller 80
Control chip drive 82
Microprocessor 84

The invention claimed is:

1. A flow control device comprising:
a valve device that is arranged in a flow line that leads to, is in, or leads from a filter system, wherein the valve device has a control section that is connected to the flow line and can be controlled via at least one deformable diaphragm;
a hydraulic device that uses an actuator to regulate pressure in a hydraulic channel, wherein the hydraulic channel is connected to the valve device in such a way that the diaphragm increases or decreases a flow cross-section depending on the pressure in the hydraulic channel;
a drive for driving the hydraulic device;
a control unit that controls the flow control device; and
an expansion tank having a predetermined volume of air that is configured to be introduced into the hydraulic channel.

2. A flow control device comprising:
a valve device that is arranged in a flow line that leads to, is in, or leads from a filter system, wherein the valve device has a control section that is connected to the flow line and can be controlled via at least one deformable diaphragm;
a hydraulic device comprising an actuator, a valve side on one side of the actuator, and a drive side on an opposite side of the actuator, wherein the actuator separates the valve side from the drive side, the actuator is configured to regulate pressure in a hydraulic channel, and the hydraulic channel is connected to the valve device in such a way that the diaphragm increases or decreases in cross-section depending on the pressure in the hydraulic channel;
a drive for driving the hydraulic device;
a control unit that controls the flow control device; and
a pressure transmission device for assisting the drive in driving the hydraulic device, the pressure transmission device comprising a transmission chamber, a transmission diaphragm within the transmission chamber, a tapped pressurized hydraulic line, and a drive side medium line, wherein
the transmission diaphragm divides the transmission chamber into a tapped line hydraulic side and a drive medium side,
the tapped pressurized hydraulic line is tapped from a pressurized hydraulic line and in fluid communication with the pressurized hydraulic line and with the tapped line hydraulic side of the transmission chamber,
the drive side medium line is in communication with the drive medium side of the transmission chamber and the drive side of the hydraulic device,
the tapped pressurized hydraulic line is configured to feed hydraulic fluid from the tapped pressurized hydraulic line into the tapped line hydraulic side of the transmission chamber, and
the drive side medium line is configured to feed a drive side medium from the drive medium side of the transmission chamber into the drive side of the hydraulic device.

3. The flow control device according to claim 2, wherein the diaphragm of the diaphragm valve is cylindrical.

4. The flow control device according to claim 2, wherein the control unit measures the pressure in the hydraulic channel or a force acting on the actuator and limits or switches off the drive when a pressure or force limit value is exceeded.

5. The flow control device according to claim 2, wherein, in the open state of the valve device, the drive is essentially switched off.

6. The flow control device according to claim 2, further comprising a plurality of valve devices arranged in a multifunctional block.

7. The flow control device according to claim 2, further comprising a valve chamber and a cover with which the valve chamber can be closed.

8. The flow control device according to claim 2, wherein a pressure in the hydraulic channel during operation is at least 50% of a pressure in the flow line.

9. The flow control device according to claim 2, wherein the control section is designed as a valve chamber with a valve element the valve element has a partition and openings, and the openings lead a working fluid past the partition.

10. The flow control device according to claim 9, wherein the valve element is substantially prismatic or cylindrical and has a smaller diameter toward the center than at the edge.

11. The flow control device according to claim 9, wherein the openings are elongated holes.

12. The flow control device according to claim 9, wherein the valve element is substantially prismatic or cylindrical and has a smaller diameter toward the center than at the edge.

13. The flow control device according to claim 2, wherein the valve device is continuously adjustable and lockable in any intermediate position.

14. The flow control device according to claim 2, wherein the drive side medium line is a pneumatic line and the drive medium side of the transmission chamber is a pneumatic side of the transmission chamber.

15. The flow control device according to claim 14, wherein the drive side medium is compressed air.

16. The flow control device according to claim 2, wherein the tapped pressurized hydraulic line is the hydraulic channel.

17. A method for operating a flow control device comprising the following steps:
- driving a hydraulic device to introduce hydraulic fluid into, or remove hydraulic fluid from, a hydraulic line, the hydraulic device comprising an actuator, a valve side on one side of the actuator, and a drive side on an opposite side of the actuator;
- opening and closing a diaphragm valve by means of the hydraulic fluid in the hydraulic line;
- flowing a feed liquid in a dialysis machine through the diaphragm valve; transmitting hydraulic fluid from the hydraulic line into a hydraulic side of a transmission chamber, wherein the transmission chamber is separated by a transmission diaphragm into the hydraulic side and a drive side chamber, and the transmitting forces the transmission diaphragm toward the drive side chamber; and transmitting a drive medium from the drive side chamber of the transmission chamber into the drive side of the hydraulic device to assist with driving the hydraulic device.

18. The method according to claim 17, wherein a force of the actuator of the hydraulic device is measured and the driving of the hydraulic device is limited or switched off when a force limit value is reached.

19. The method according to claim 17, wherein the diaphragm valve is adjusted continuously and is configured to be held in any intermediate position.

20. The method according to claim 17, wherein the drive side chamber is a pneumatic chamber and the drive medium is compressed air.

* * * * *